United States Patent
Cai et al.

(10) Patent No.: US 11,886,468 B2
(45) Date of Patent: Jan. 30, 2024

(54) FINGERPRINT-BASED DATA CLASSIFICATION

(71) Applicant: INTERNATIONAL BUSINESS MACHINES CORPORATION, Armonk, NY (US)

(72) Inventors: Xu Bin Cai, Beijing (CN); Xiaobo Wang, Beijing (CN); Chun Hua Sun, Beijing (CN); Yi Wang, Beijing (CN); Wei Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

(21) Appl. No.: 17/541,704

(22) Filed: Dec. 3, 2021

(65) Prior Publication Data

US 2023/0177071 A1    Jun. 8, 2023

(51) Int. Cl.
*G06F 16/00* (2019.01)
*G06F 16/28* (2019.01)
(Continued)

(52) U.S. Cl.
CPC .......... *G06F 16/285* (2019.01); *G06F 16/221* (2019.01); *G06F 16/2264* (2019.01); *G06N 20/00* (2019.01)

(58) Field of Classification Search
CPC .... G06F 16/285; G06F 16/221; G06F 16/906; G06F 16/35
See application file for complete search history.

(56) References Cited

U.S. PATENT DOCUMENTS 6,988,134 B2   1/2006  Thorpe et al.
10,467,214 B1  11/2019  Sloan
(Continued)

FOREIGN PATENT DOCUMENTS

CN   111201531   5/2020
CN   111291070   6/2020

OTHER PUBLICATIONS

Mell et al., "The NIST Definition of Cloud Computing", NIST, Special Publication 800-145, Sep. 2011, 7 pages.
(Continued)

*Primary Examiner* — Thu Nguyet T Le
(74) *Attorney, Agent, or Firm* — Rakesh Roy; Andrew D. Wright; Calderon Safran & Cole, P.C.

(57) ABSTRACT

Systems and methods are provided for automated classification of data using fingerprints. In embodiments, a method includes: generating, by a computing device based on predetermined rules, a fingerprint of a data column in a data set to be classified, the fingerprint comprising dimensions, wherein each of the dimension is assigned an attribute representing a characteristic of data in the data column; determining, by the computing device, that the fingerprint matches one or more target fingerprints by comparing the fingerprint to the target fingerprints, wherein each target fingerprint is associated with a class and includes dimensions, and each dimension is assigned an attribute representing a characteristic of data in the class; and assigning, by the computing device, one or more classes to the data column based on the one or more target fingerprints, thereby generating classified data.

20 Claims, 15 Drawing Sheets

(51) Int. Cl.
  *G06N 20/00* (2019.01)
  *G06F 16/22* (2019.01)

(56) References Cited

U.S. PATENT DOCUMENTS

| | | |
|---|---|---|
| 2010/0094879 A1 | 4/2010 | Donnelly et al. |
| 2012/0066214 A1* | 3/2012 | Nelke .................... G06F 17/10 707/723 |
| 2017/0004352 A1 | 1/2017 | Jonsson et al. |
| 2019/0377905 A1 | 12/2019 | Rose et al. |
| 2020/0279139 A1 | 9/2020 | Collins et al. |
| 2021/0081435 A1* | 3/2021 | Kabra ................... G06F 16/285 |

OTHER PUBLICATIONS

International Search Report and Written Opinion for PCT/CN2022/134565 dated Feb. 17, 2023; 7 Pages.

* cited by examiner

| Dimension | Attribute |
|---|---|
| Length | 17 |
| Min-Max | 0~9000 |
| Format | C9CC999H |
| Unique | F |
| FD | 10% |
| SpecialC | -3 |

| Dimension | Attribute | Weight |
|---|---|---|
| Length | 17 | 50% |
| Min-Max | 0~9999 | 5% |
| Format | C9CC999H | 40% |
| Unique | T | 2% |
| FD | 90% | 1% |
| SpecialC | -3 | 2% |

FIG. 8

| Dimension | Attribute |
|---|---|
| Length | 16 |
| Min-Max | 110....-999... |
| Format | 9(15)9H |
| Unique | T |
| FD | 10% |
| SpecialC | N/A |

1100

Example 1

110100200011113217

13500001111

Example 2 schunh@cn.acme.com kevin@cn.acme.com

FIG. 11

FINGERPRINT-BASED DATA CLASSIFICATION

BACKGROUND

Aspects of the present invention relate generally to data classification and, more particularly, to automated fingerprint-based data classification.

Data classification may be broadly defined as the process of organizing (classifying) data by relevant classes so that it the classified data can be used and protected more efficiently. Various full data classification methods and tools exist to assist users in classifying sets of data. In general, a full data classification process analyzes the data or metadata of data assets, uses a specialized classifier tool to detect the probable matching data class for that data, and assigns matching classes to the date (e.g., to columns of data).

Full data classification tools and methods match classes to data by analyzing every row of data in a data column against every elected class. In cases where a data set being analyzed is large, such automated classification may require significant computing resources and time. For example, it can take several days to analyze many columns of data. In theory, if there are M columns in a table and N data classes in a system, each column must be processed by N data classes.

SUMMARY

In a first aspect of the invention, there is a computer-implemented method including: generating, by a computing device based on predetermined rules, a fingerprint of a data column in a data set to be classified, the fingerprint comprising column dimensions, where each of the column dimensions is assigned an attribute representing a characteristic of data in the data column. The method further includes determining, by the computing device, that the fingerprint matches one or more target fingerprints by comparing the fingerprint to the target fingerprints, where each target fingerprint is associated with a class and includes class dimensions, and each class dimension in is assigned an attribute representing a characteristic of data in the class. Additionally, the method includes assigning, by the computing device, one or more classes to the data column based on the one or more target fingerprints, thereby generating classified data. Advantageously, utilizing fingerprints of data to identify probable matching classes for columns of data utilizes fewer computing resources than conventional full classification methods.

In implementations, the method further includes generating a fingerprint tree for each of the target fingerprints. Each fingerprint tree defines rules of priority for the class dimensions of a respective target fingerprint, where determining that a fingerprint matches one or more target fingerprints comprises comparing column dimensions of the fingerprint to class dimensions of the one or more target fingerprints based on the rules of priority defined by the fingerprint tree. Advantageously, utilizing fingerprint trees to define rules of priority enables embodiments of the invention to compare only a subset of class dimensions during fingerprint-based classification, thereby further improving the efficiency of the fingerprint-based classification process.

In another aspect of the invention, there is a computer program product including one or more computer readable storage media having program instructions collectively stored on the one or more computer readable storage media. The program instructions are executable to cause a computing device to: generate, based on predetermined rules, a fingerprint of a data column in a data set to be classified, the fingerprint comprising column dimensions, where each of the column dimensions is assigned an attribute representing a characteristic of data in the data column. The program instructions further cause the computing device to determine whether the fingerprint matches one or more target fingerprints by comparing the fingerprint to the target fingerprints, where each target fingerprint is associated with a class and includes class dimensions, and each class dimension is assigned an attribute representing a characteristic of data in the class. In response to determining that the fingerprint matches the one or more target fingerprints, the program instructions further cause the computing device to assign one or more classes to the data column based on the one or more target fingerprints, thereby generating classified data. In response to determining that the fingerprint does not match the one or more target fingerprints, the program instructions further cause the computing device to perform a full data classification of the data column by comparing data of the data column to multiple data classes to determine whether at least one of the multiple data classes is associated with the data column. As noted above, utilizing fingerprints of data to identify probable matching classes for columns of data utilizes fewer computing resources than conventional full classification methods.

In embodiments, the program instructions are further executable to cause the computing device to generate a fingerprint tree for each of the target fingerprints, each fingerprint tree defining rules of priority for the class dimensions of a respective target fingerprint, where the determining that the fingerprint matches the one or more target fingerprints comprises comparing the column dimensions of the fingerprint to the class dimensions of the one or more target fingerprints based on the rules of priority defined by the fingerprint tree. As noted above, utilizing fingerprint trees to define rules of priority enables embodiments of the invention to compare only a subset of class dimensions during fingerprint-based classification, thereby improving the efficiency of the classification process.

In another aspect of the invention, there is a system including a processor, a computer readable memory, one or more computer readable storage media, and program instructions collectively stored on the one or more computer readable storage media. The program instructions are executable to cause a computing device to: generate, based on predetermined rules, a fingerprint of a data column in a data set to be classified, the fingerprint comprising column dimensions, where each of the column dimensions is assigned an attribute representing a characteristic of data in the data column. The program instructions further cause the computing device to determine whether the fingerprint matches one or more target fingerprints by comparing the fingerprint to the target fingerprints, where each of the target fingerprints is associated with a class and includes class dimensions, and each class dimension is assigned an attribute representing a characteristic of data in the class. In response to determining that the fingerprint matches the one or more target fingerprints, the program instructions cause the computing device to assign one or more classes to the data column based on the one or more target fingerprints, thereby generating classified data. In response to determining that the fingerprint does not match the one or more target fingerprints, the program instructions cause the computing device to perform a full data classification of the data column by comparing data of the data column to multiple data classes to determine whether at least one of the multiple data classes is associated with the data column. As previously noted, utilizing fingerprints of data to identify probable matching classes for columns of data utilizes fewer computing resources than conventional full classification methods.

In embodiments, the program instructions of the system are further executable to cause the computing device to generate a fingerprint tree for each of the target fingerprints, each fingerprint tree defining rules of priority for the class dimensions of a respective target fingerprint, where the determining that the fingerprint matches the one or more target fingerprints comprises comparing the column dimensions of the fingerprint to the class dimensions of the one or more target fingerprints based on the rules of priority defined by the fingerprint tree. As previously noted, utilizing fingerprint trees to define rules of priority enables embodiments of the invention to compare only a subset of class dimensions during fingerprint-based classification, thereby improving the efficiency of the classification process.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 8 is a diagram illustrating fingerprint matching in accordance with embodiments of the invention.

FIG. 11 illustrates an exemplary quality feedback scenario in accordance with embodiments of the invention.

DETAILED DESCRIPTION

Figure 1:
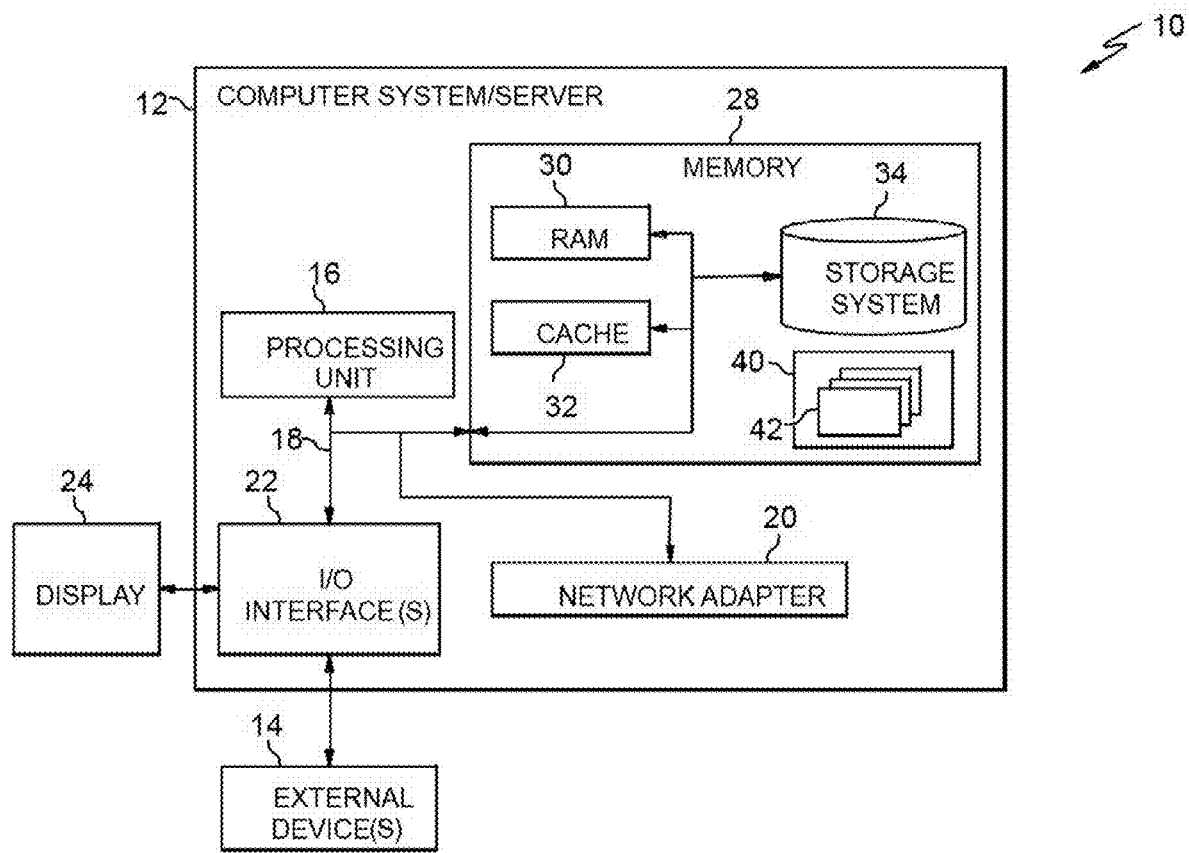
FIG. 1 depicts a cloud computing node according to an embodiment of the present invention.

Aspects of the present invention relate generally to data classification and, more particularly, to automated fingerprint-based data classification. In embodiments, a server automatically creates a fingerprint for data classes and data assets; maps the fingerprint of data assets and data classes, and scans data assets to identify the final classification of data columns based on the mapping. In this manner, implementations of the invention decrease computing resources consumed during automated data classification as compared to full data classification methods.

In embodiments, a method includes utilizing a fingerprint building component (e.g., a fingerprinting module) to extract a fingerprint of data based on statistical characteristics of the data. In implementations, the method includes building multiple fingerprint trees according to fingerprint dimension weights (which can largely improve the match process) by: scanning all fingerprint dimensions to select the most common dimension as a leading key to build the tree; and scanning all the fingerprint dimensions to select the dimension as the leading key to build the tree with a weight greater than a threshold. In aspects of the invention, the method includes automated building of new fingerprints to improve the automated fingerprint-based classification system. The fingerprint-based classification may include: calculating all fingerprints for a source data set; grouping the fingerprints by the distributions by, for example: 1) checking Length and Format dimensions as first priority and grouping the fingerprints; 2) if the Length and Format does not have a good distribution, check for special characters (SpecialC) dimension as a second priority; and 3) if no match of the fingerprint is identified, treat the data set as a poor quality data set or manually classify/process the data set.

Advantageously, embodiments of the invention provide an improved automated data classification system and method, by providing a new way of identifying probable matching classes for columns of data utilizing a column fingerprint and target fingerprints associated with classes of data. Implementations of the invention significantly decrease the computing costs of automated classification by reducing computing resources and time needed to automatically classify large sets of data. Accordingly, implementations of the invention provide a technical solution (e.g., fingerprint-based classification) to the technical problem of high computing costs associated with existing automated data classification methods.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
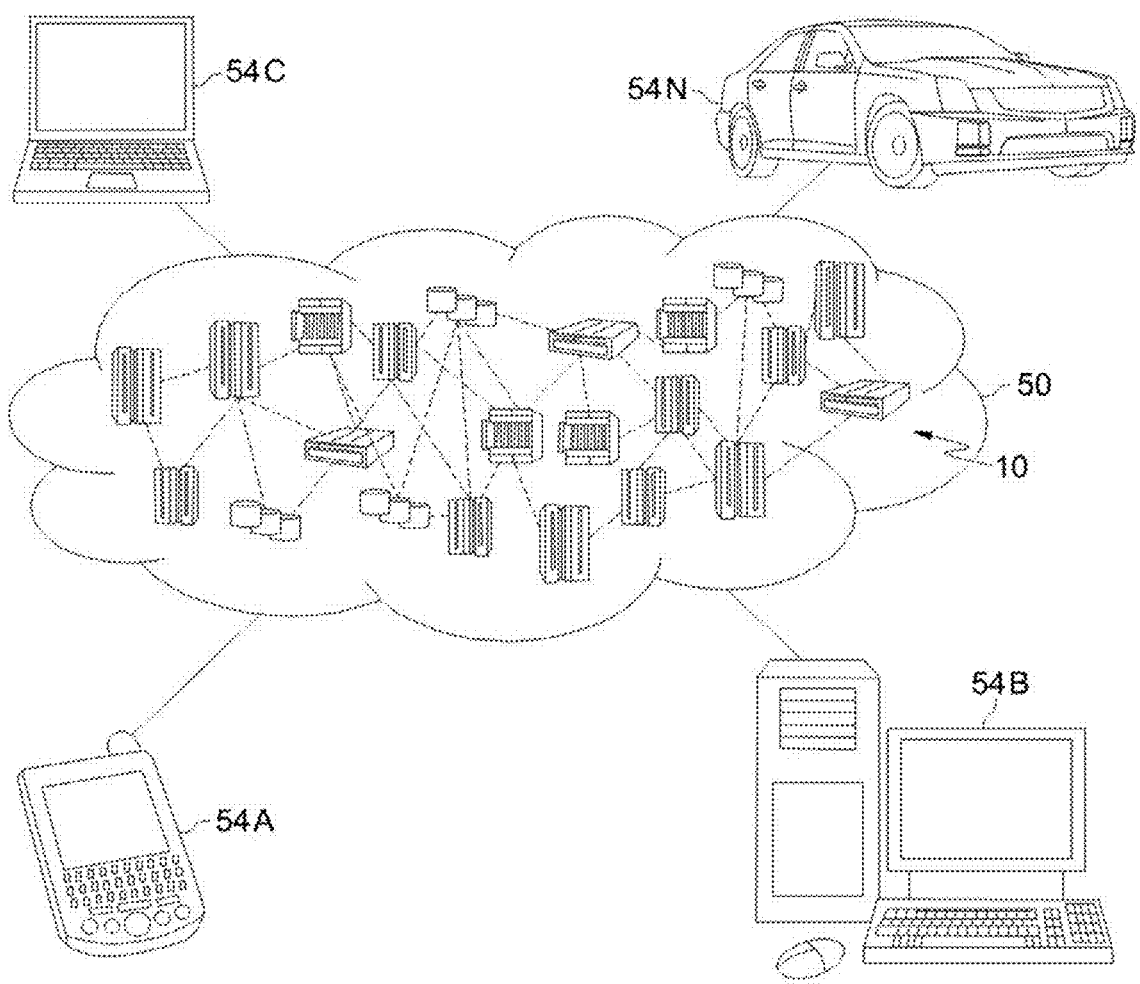
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
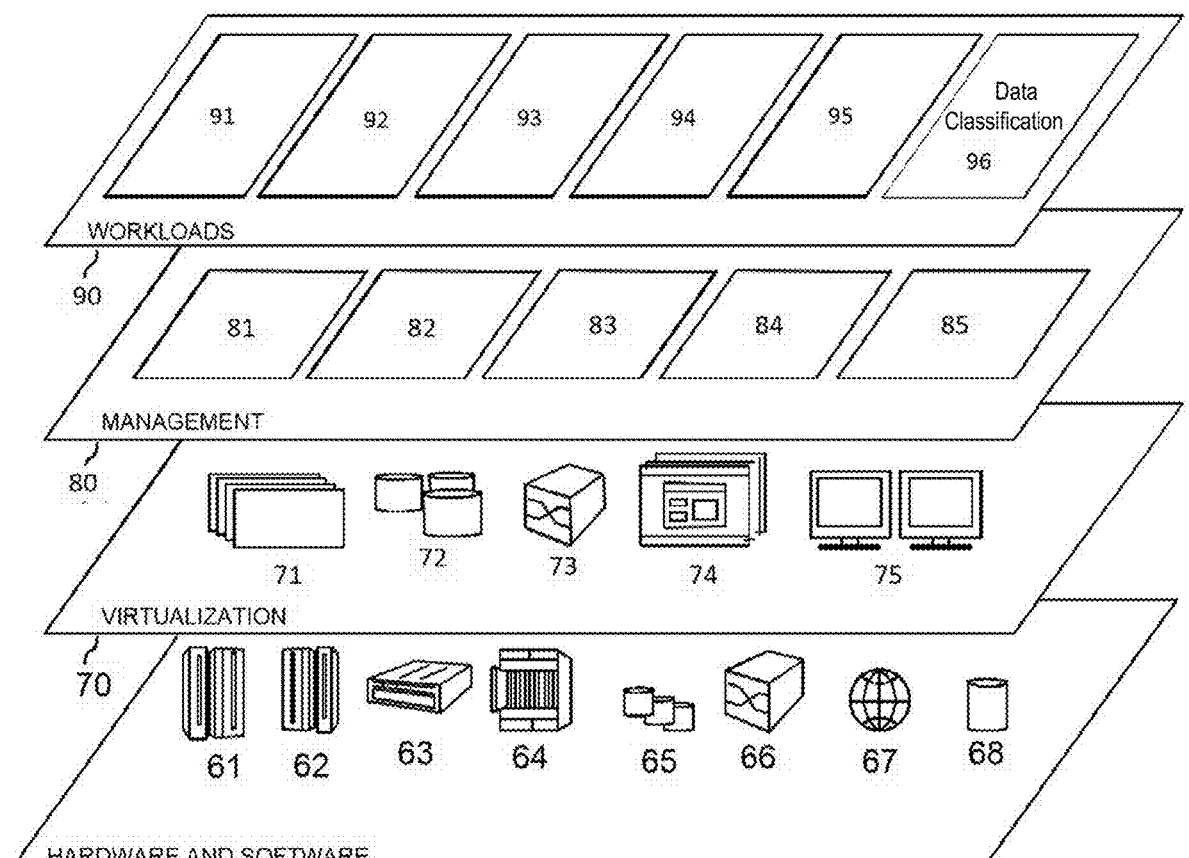
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data classification 96.

Implementations of the invention may include a computer system/server 12 of FIG. 1 in which one or more of the program modules 42 are configured to perform (or cause the computer system/server 12 to perform) one of more functions of the data classification 96 of FIG. 3. For example, the one or more of the program modules 42 may be configured to: generate a fingerprint for each column of data to be classified; generate a fingerprint tree for each fingerprint defining an order of dimension priority; perform a fingerprint-based classification of data to be classified; determine that a fingerprint for a column of data matches a data class based on the fingerprint-based classification; and assigning the data class to the column of data at issue.

Figure 4:
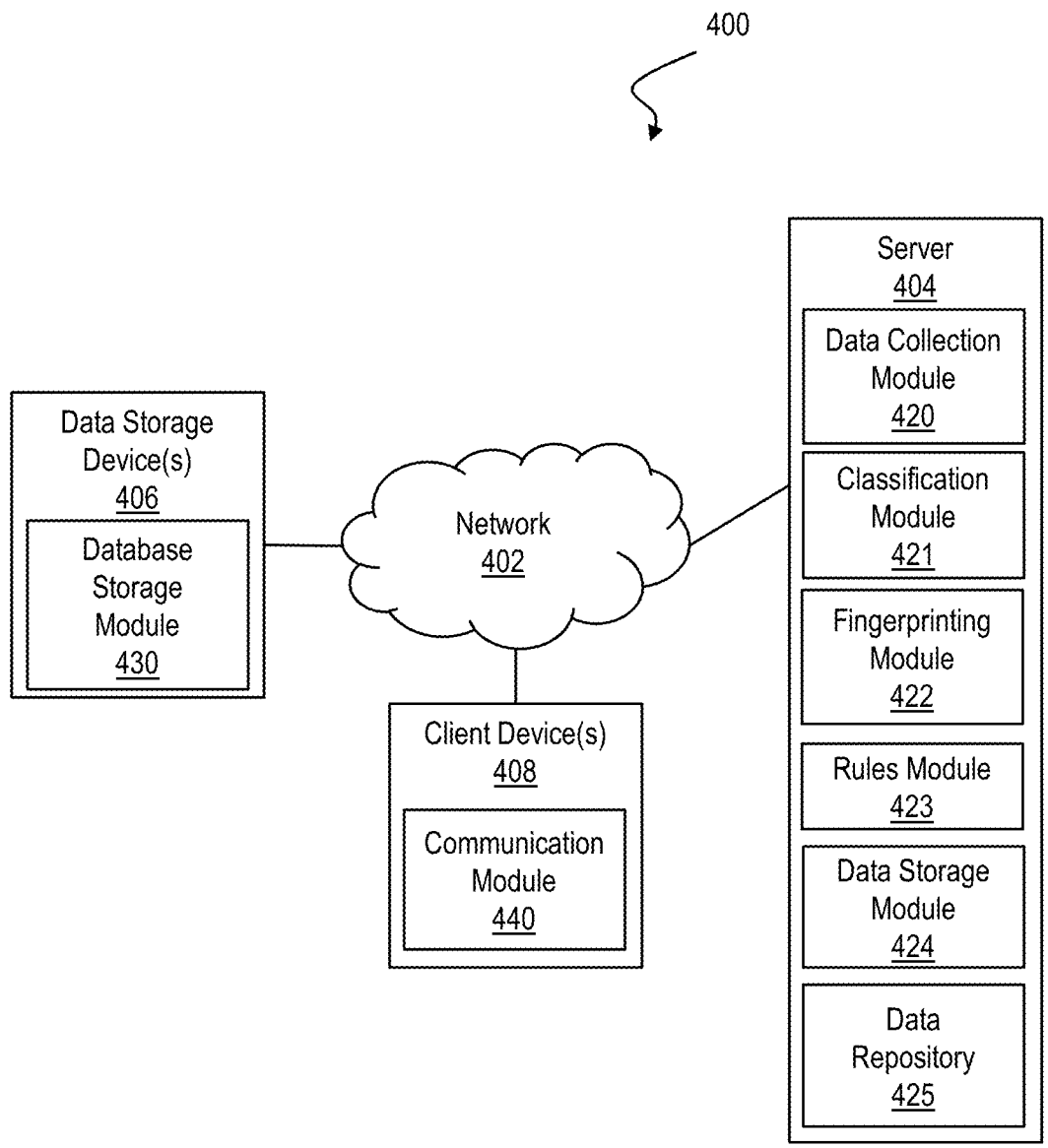
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 402 enabling communication between a server 404, one or more data storage devices 406, and a plurality of client devices 408.

The server 404 may comprise the computer system/server 12 of FIG. 1, or elements thereof. In embodiments, the server 404 is a computing node 10 in the cloud computing environment 50 of FIG. 2. In embodiments, the server 404 comprises one or more modules, each of which may comprise one or more program modules such as program modules 42 described with respect to FIG. 1. In the example of FIG. 4, the server 404 includes a data collection module 420, a classification module 421, a fingerprinting module 422, a rules module 423 and a data storage module 424 configured to store data in a data repository (e.g., data repository 425), each of which may comprise one or more program module(s) 42 of FIG. 1, for example.

In implementations, the data collection module 420 is configured to collect data sets from local storage, from one or more data storage devices 406, and one or more client devices 408. The term data set as used herein refers to data configured in one or more tables with columns and rows. In implementations, the server 404 obtains a data set in response to sending a request for data to a data storage module 430 of the one or more data storage devices 406 and/or the communication module 440 of the one or more client devices 408.

In aspects of the invention the classification module 421 is configured to classify data sets utilizing both full classification methods (wherein columns of data are run against each elected class of data) and fingerprint-based classification in accordance with embodiments of the invention. In implementations, the classification module 421 provides a user interface (UI) that can be accessed by local or remote users (e.g., users of client devices 408) to initiate classification of data sets, select settings and rules, and elect a subset of data classes to utilize for a classification event from an available set of classes.

In embodiments, the fingerprinting module 422 is configured to generate fingerprints for each column of data as well as target fingerprints for each class of data. The term fingerprint as used herein refers to a set of data (e.g., a table of data) that identifies and/or describes the original data (e.g., a column of data) based on predetermined rules, the set of data including multiple dimensions each having an attribute that represents a characteristic of the data (e.g., identifies and/or describes the dimension). In embodiments, each fingerprint dimension is assigned a weight. In implementations, the fingerprinting module 422 is also configured to generate fingerprint trees for each of the fingerprints, wherein the fingerprint trees determine how the server 404 applies dimensions of each fingerprint during the fingerprint-based classification process.

In aspects of the invention, the rules module 423 is configured to generate and store rules for use during classification processes of the server 404. In embodiments, the server 404 provides a UI to remote or local users to access the rules module 423 to configure and/or select classification rules for classification processes of the server 404.

In implementations of the invention, a data storage module 424 stores data generated and/or obtained by the server 404. In embodiments, data sets obtained by the data collection module 420 are stored by the data storage module 424 in either a local database (e.g., the data repository 425) or a remote (e.g., cloud) database (e.g., data storage module 430). In implementations, fingerprints and fingerprint trees generated by the fingerprinting module 422 are stored by the data storage module 424 in local and/or remote storage locations.

The server 404, one or more data storage devices 406 and one or more client devices 408 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Figure 5:
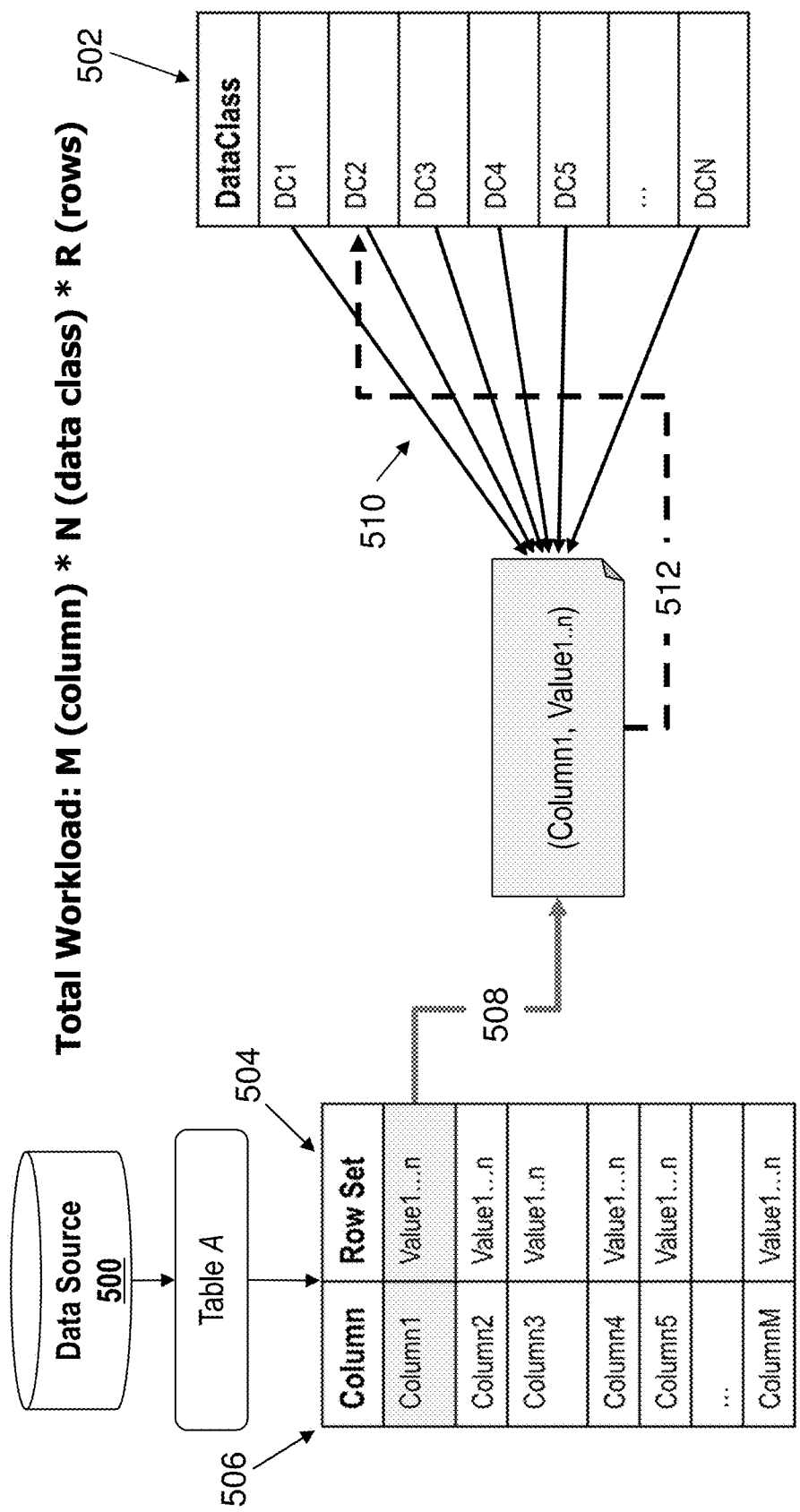
FIG. 5 is a diagram depicting a full data classification method wherein all elected data classes are evaluated.

FIG. 5 is a diagram depicting a full data classification method wherein all elected data classes are evaluated. Steps represented in FIG. 5 may be carried out in the environment of FIG. 4 and are described with reference to elements depicted in FIG. 4.

In the method depicted, a data source (data asset) 500 is obtained, and each table of data (e.g., Table A) in the data source 500 is evaluated, column by column (e.g., column1 through column$_m$), to determine if any elected data classes 502 match the row sets 504 for each of the columns 506. In one example, the server 404, using the method of FIG. 5, selects column1, including data represented by Value$_1$ . . . n at 508, and compares the data of the column to predetermined parameter sets associated with each the elected classes during a full data classification analysis at 510, until a match is found, if any. In the example of FIG. 5, a match is found at 512 between the column (column1) of a data set being classified and DC2 (data class 2) after N number of classes are analyzed. It can be understood that this general classification method may require significant computer resources. The total workload for a data classification job like the one illustrated in FIG. 5 may be described by the following formula. Total Workload=M (number of columns) *N (number of data classes)*R (number of rows of data).

Figure 6:
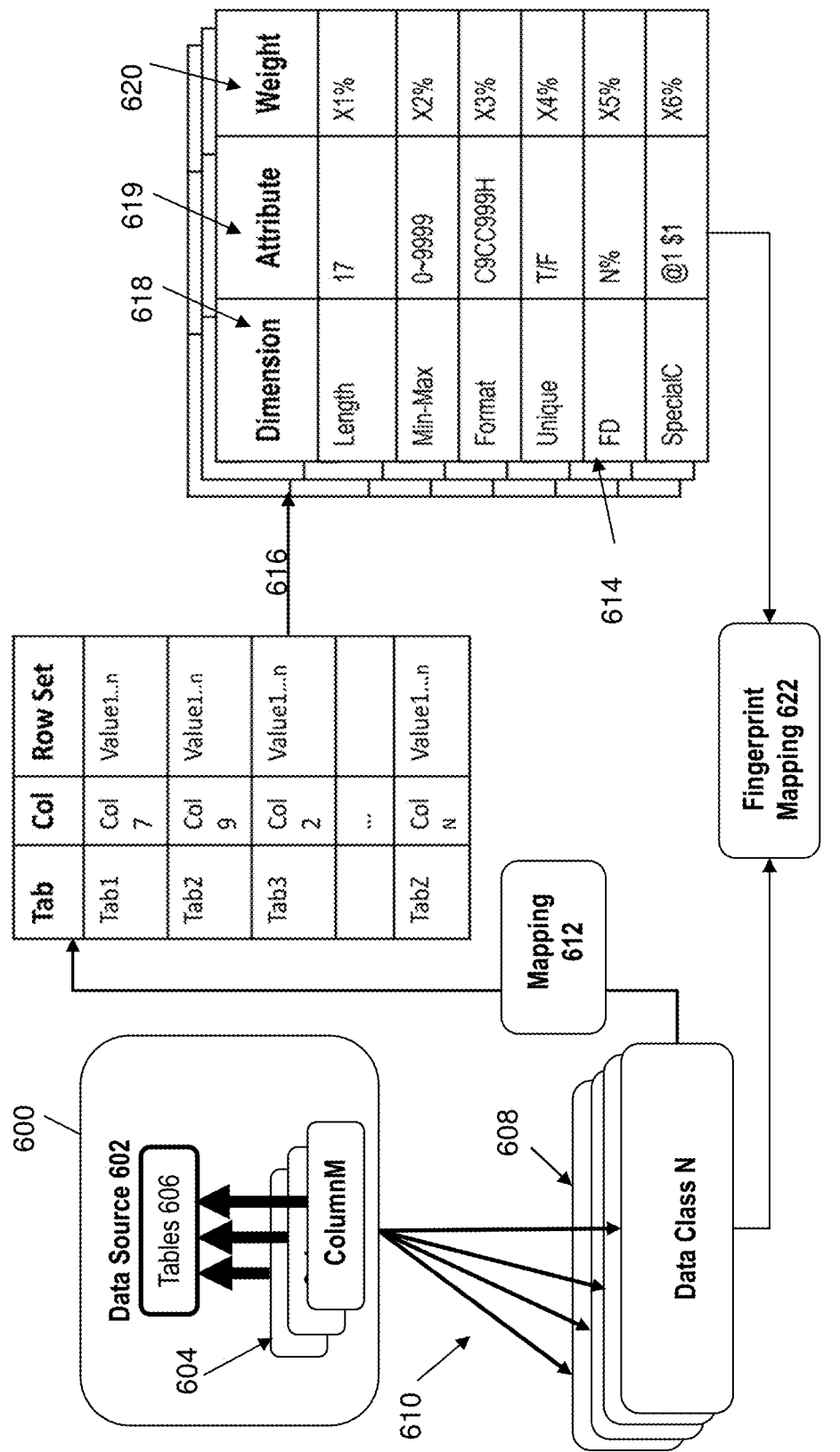
FIG. 6 is a diagram illustrating a fingerprint data classification method in accordance with embodiments of the invention.

FIG. 6 is a diagram illustrating a fingerprint data classification method in accordance with embodiments of the invention. Steps represented in FIG. 6 may be carried out in the environment of FIG. 4 and are described with reference to elements depicted in FIG. 4.

Initially, a corpus of classified training data is obtained by a server 404 at 600, by either classifying the data using, for example, a full data classification method, or by obtaining the data from another source (e.g., from a data storage device 406). In the example of FIG. 6, the server 404 access a data source 602, and classifies each column 604 of tables 606 of the data source 602 based on elected data classes 608 at 610 to create a mapping of data classes and columns of data represented at 612. The server 404 then builds a target fingerprint (e.g., 614) for each elected data class based on the mapping 612 at 616. A target fingerprint (e.g., 614) for each class may comprise multiple class dimensions 618. In the example of FIG. 6, class dimensions 618 of the target fingerprint 614 include: Length, Min-Max, Format, Unique, frequency distribution (FD) and SpecialC. As illustrated, for each class dimension 618, an attribute 619 is determined by the server 404. Additionally, for each class dimension 618 a weight 620 is determined by the server 404. The server 404 then generates a data class to fingerprint map 622 for use in fingerprint-based classification methods discussed below.

Figure 7:
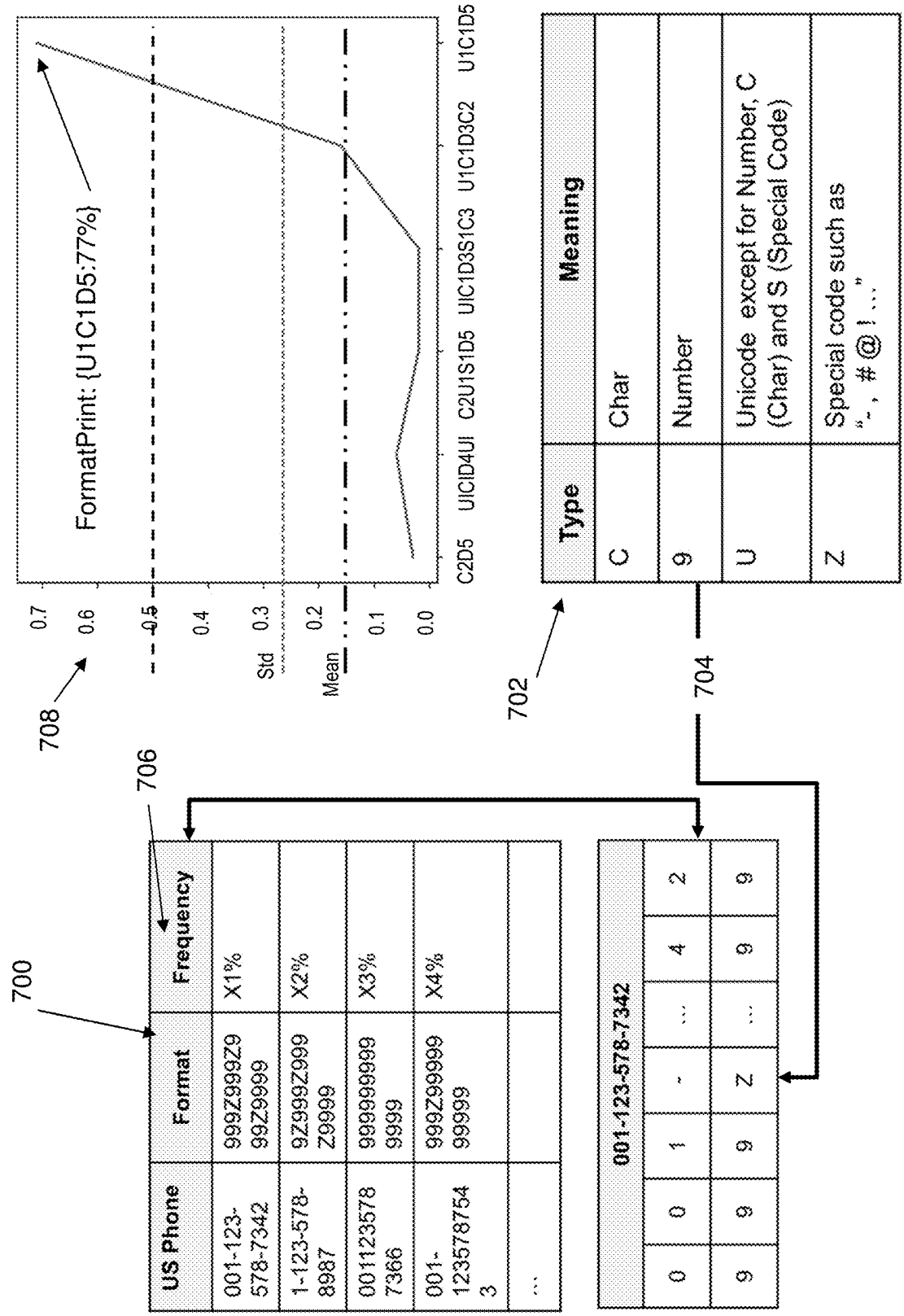
FIG. 7 is a diagram illustrating an exemplary fingerprint in accordance with embodiments of the invention.

FIG. 7 is a diagram illustrating an exemplary fingerprint in accordance with embodiments of the invention. Steps represented in FIG. 7 may be carried out in the environment of FIG. 4 and are described with reference to elements depicted in FIG. 4.

In the example of FIG. 7, fingerprint attributes 700 are depicted for the dimension "Format" in the class "US Phone" (e.g., U.S. phone number class). Fingerprint rules 702 define the generation of the fingerprint attributes for the dimension "Format". In this example, "C" stands for a character in the data; "9" stands for a number in the data; "U" stands for a Unicode, with the exception for a number, a character and special codes (Z); and Z stands for special codes, such as "-,#@! . . . ". In the example shown, the server 404 applies the rules 702 to a first telephone number "001-123-578-7342" as depicted at 704 and obtains the fingerprint attributes "999Z999Z999Z9999" for the dimension "Format". In aspects of the inventions, the server 404 determines a frequency 706 (e.g., X1%-X4%), which represents the percentage of rows of a column that match the format fingerprint attributes (e.g., 999Z999Z999Z9999). For example, if there are 1000 rows in a table, and there are 900 rows that match the format "999Z999Z999Z9999", then the frequency is 90%. In embodiments, the server 404 graphs frequency statistics as depicted at 708 to determine the frequency with which the format fingerprint (e.g., 999Z999Z999Z9999) match rows in a column (e.g., column C2D5, UICID4UI, etc.).

Table 1 below depicts a fingerprint generated for the first telephone number "001-123-578-7342", including the Format dimension shown in FIG. 7, as well as dimensions: Length, Min-Max, Unique, FD and SpecialC. In implementations, the server 404 assigns weights to each dimension based on predetermined rules. In the exemplary fingerprint in Table 1: attribute "16" means that the length of data is 16 (e.g., digits/spaces); a minimum number is "1100000000000000" and a maximum number is "9999999999999999"; "999Z999Z999Z9999" illustrates the format according to the example of FIG. 7, TRUE means the values are unique, 100% means this format is 100% of all rows, and -3 ('-' count 3) indicates a type of special character.

TABLE 1

Exemplary Fingerprint for class "US Phone"

| Dimension | Attribute | Weight |
| --- | --- | --- |
| Length | 16 | X1% |
| Min-Max | 001-000-000-0000 001-999-999-9999 | X2% |
| Format | 999Z999Z999Z9999 | X3% |
| Unique | TRUE | X4% |
| FD | 100% | X5% |
| SpecialC | -3 ('-' count 3) | X6% |

FIG. 8 is a diagram illustrating fingerprint matching in accordance with embodiments of the invention. Steps represented in FIG. 8 may be carried out in the environment of FIG. 4 and are described with reference to elements depicted in FIG. 4.

In the example of FIG. 8, a fingerprint 800 from a data source to be classified includes column dimensions 802 having attributes 804. Initially, the server 404 determines leading keys (leading dimensions) to utilize during fingerprint matching. In implementations, the server 404 ranks class dimensions 806 of target fingerprints 808 according to the dimension weights 810 and predetermined threshold values, wherein the higher dimension weights are ranked higher. In embodiments, the server 404 scans all class dimensions 806 of the target fingerprints 808 and selects the most common class dimensions as leading keys (e.g., first, second and third leading keys, or dimensions with weight above a threshold) to build a fingerprint tree. In the example of target fingerprint 808A, a fingerprint tree would include the length dimension first (weight 50%), the format dimension second (weight 40%) and the Min-Max dimension third (5%), when the threshold is set at 5% and higher.

In embodiments of the invention the sever 404 generates the fingerprint 800 for the data source to be classified and compares it to the target fingerprints 808 generated based on training data, to determine if column dimensions of the fingerprint 800 match the class dimensions of one or more of the target fingerprints 808. In implementations, the server 404 determines a match between a fingerprint of a data source and a target fingerprint when the percent (%) of column dimensions of the fingerprint of the data source that match class dimensions of the target fingerprint is above a predetermined threshold value. In the example of FIG. 8, the length dimension, format, and SpecialC match, the Min-Max is a partial match (i.e., minimum values match), and the Unique and FD dimensions do not match.

Figure 9:
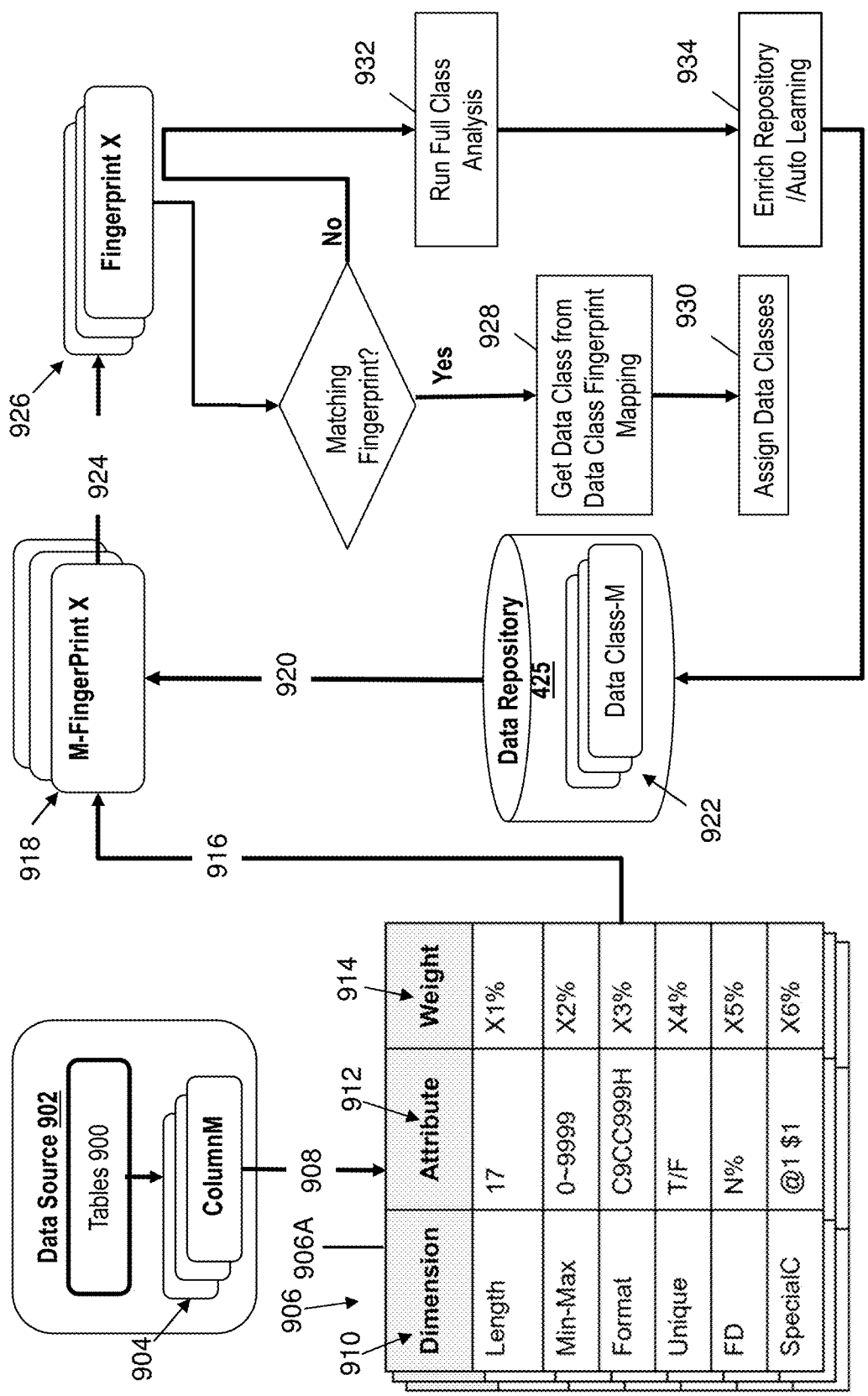
FIG. 9 is a diagram illustrating a data class matching method in accordance with embodiments of the invention.

FIG. 9 is a diagram illustrating a data class matching method in accordance with embodiments of the invention. Steps represented in FIG. 9 may be carried out in the environment of FIG. 4 and are described with reference to elements depicted in FIG. 4.

Referencing FIG. 9, the server 404 accesses data tables 900 of the data source 902, wherein the data tables 900 having columns of data 904 to be classified. The server 404 generates a fingerprint (e.g., 906A) for each column of data 904 at 908, wherein each fingerprint is in the form of a table having a column of column dimensions 910, a column of dimension attributes 912 and a column of weights 914. At 916, the server 404 compares the fingerprints 906 of the data source 902 with target fingerprints 918 fetched at 920 from a data repository 425 including data class mappings 922, to determine if any of the fingerprints 906 match the target fingerprints 918. At 924, the server 404 determines, for each column of data 904, if there are one or more matching target fingerprints 926, and if there are, then the server 404 determines the data classes of the matching target fingerprints 926 based on the fingerprint mappings 922 at 928, and assigns the data classes of the matching target fingerprints 926 to the fingerprints 906 at 930. On the other hand, if there are no matching target fingerprints 926 for a class, then the server 404 runs a full data classification analysis at 932. The server 404 may then update or enrich the data repository 425 at 934 with the new classification data from the full data classification analysis of 932.

Figure 10:
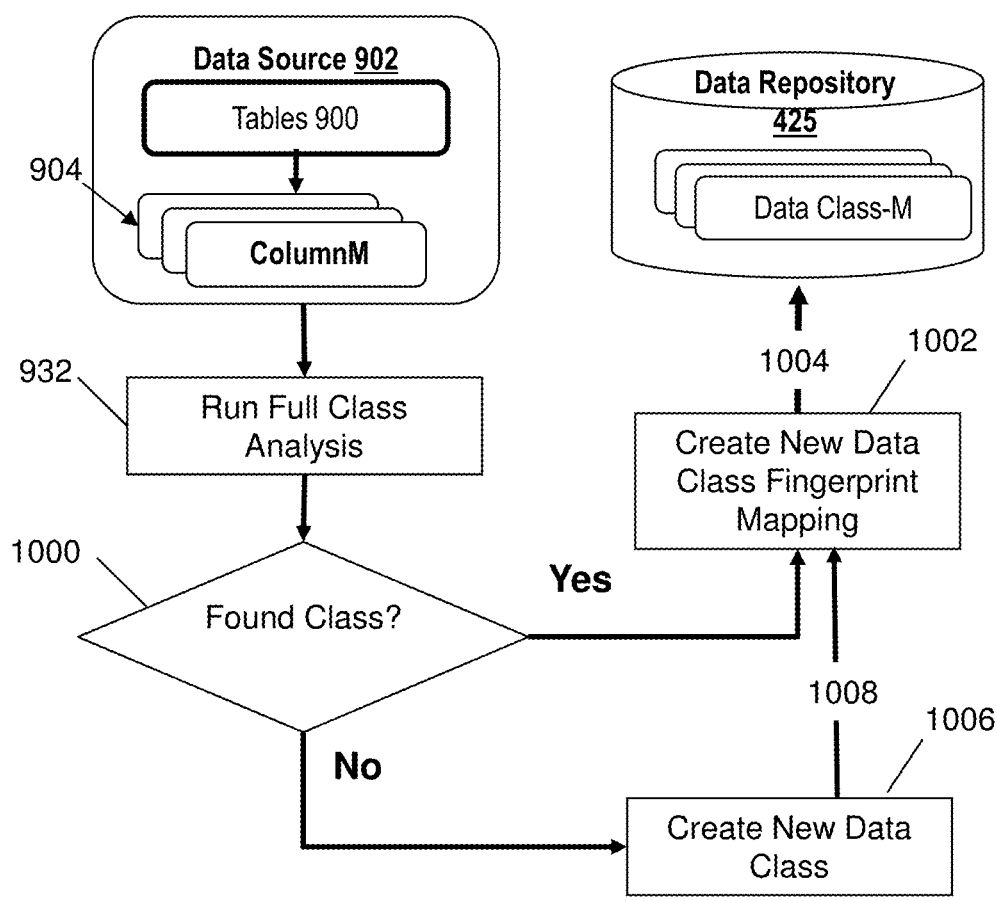
FIG. 10 is a flow diagram illustrating an automatic data class building process in accordance with embodiments of the invention.

FIG. 10 is a flow diagram illustrating an automatic data class building process in accordance with embodiments of the invention. Steps represented in FIG. 10 may be carried out in the environment of FIG. 4 and are described with reference to elements depicted in FIGS. 4 and 9.

In accordance with the method depicted in FIG. 9. the server 404 initially accesses a data source 902 to be classified, including data tables 900 having columns indicated at 904. In the case where the server 404 runs a full class analysis at 932, the server 404 determines if any elected classes match the data in the columns 904 at 1000. If the server 404 matches elected data classes to the columns during the full data class analysis at 932, then the server 404 creates a new data class fingerprint map at 1002 (in accordance with step 934 in FIG. 9), and the mapping is added to the data repository 425 at 1004. If the server 404 does not find any matching data classes for a column during the full data class analysis at 932, then the server 404 assigns a new data class for the column at 1006 (based on a manual input by a user or automatically based on rules), creates a new mapping of the data class to a fingerprint of the column at issue, and adds the mapping to the data repository 425 at 1008.

FIG. 11 illustrates an exemplary quality feedback scenario in accordance with embodiments of the invention. Steps represented in FIG. 11 may be carried out in the environment of FIG. 4 and are described with reference to elements depicted in FIG. 4.

In the example of FIG. 11, the server 404 has generated a fingerprint 1100 for a column of a data set to be classified. The column dimensions of the fingerprint 1100 are weighted by distribution, and the server 404 determines a fingerprint tree comprising: Length, Format, and SpecialC. The server 404 compares columns of data from the data set with the fingerprint 1100. In this case, rules indicated that if Length and Format (first priority) do not have good distribution, then check SpecialC as second priority. If no fingerprint match is identified after checking the SpecialC, then the server 404 treats the data set as a poor-quality data set. In a first example illustrated in FIG. 11, a number "110100200011113217" in a data column does not match the format dimension of the fingerprint 1100, because it has length of 18 digits, not 16. In a second example, the format length in a data column does not match the format length of the fingerprint 1100, but the data of the column includes one (1) special character (1C) that matches the 1C in the format dimension of the fingerprint 1100. In the case where the server 404 determines that the data set is a poor-quality data set, the server 404 can automatically build a data class and matching fingerprint for storage in the data repository 425.

Figure 12A:
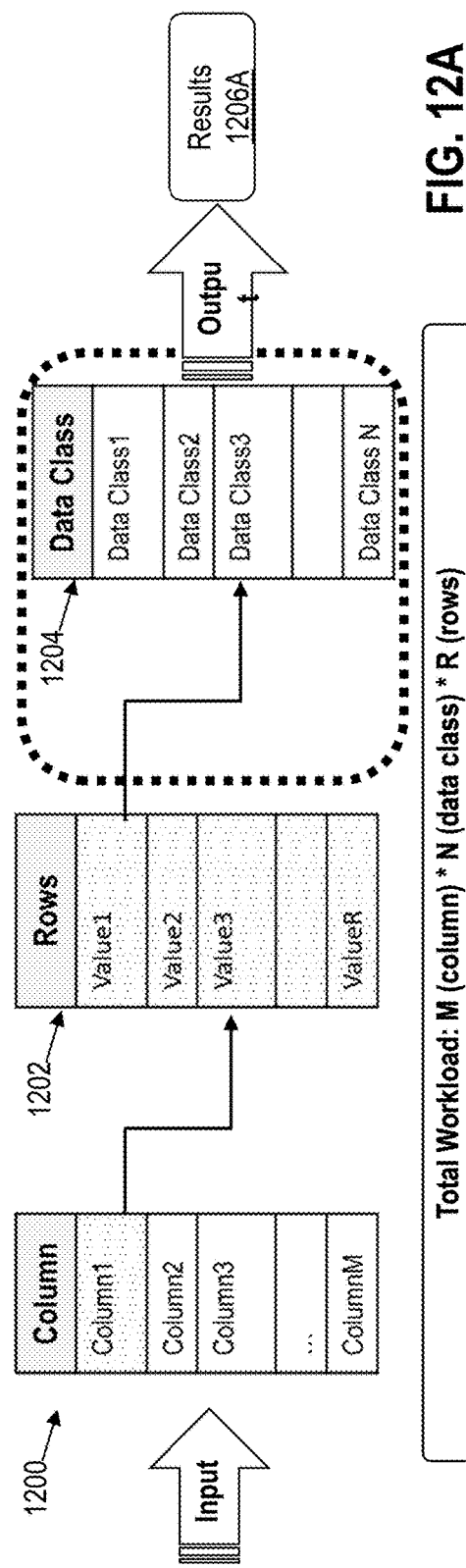
FIGS. 12A and 12B are diagrams illustrating the difference between workloads of a full data classification method and a fingerprint data classification method according to embodiments of the invention.
Figure 12B:
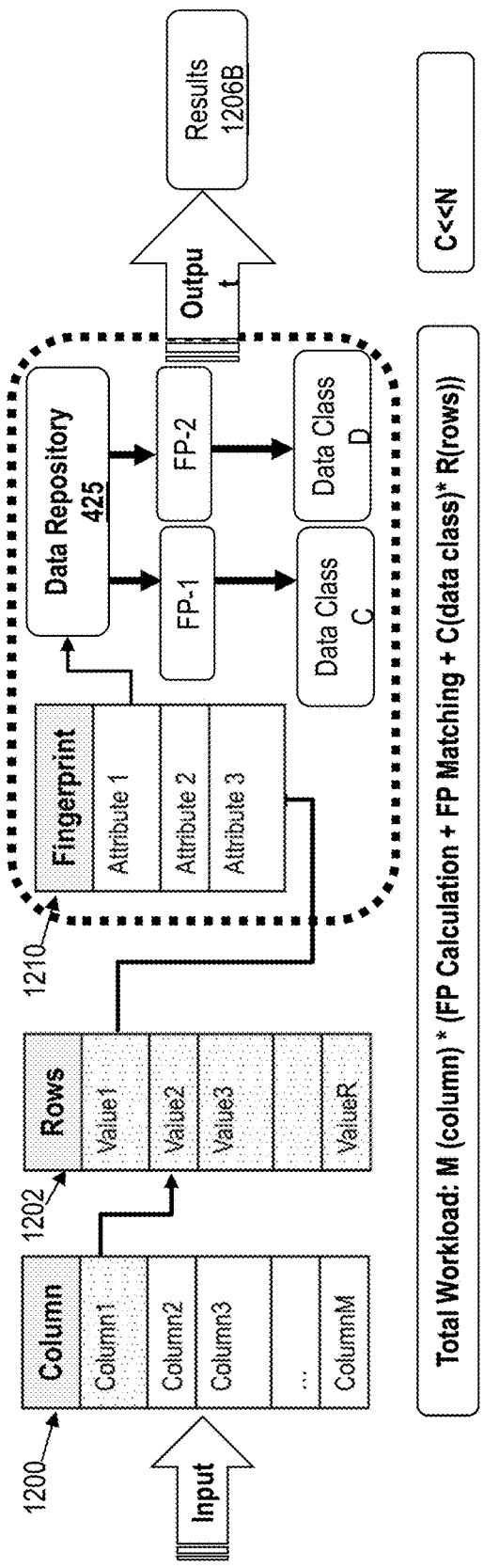

FIGS. 12A and 12B are diagrams illustrating the difference between workloads of a full data classification method and a fingerprint data classification method according to embodiments of the invention. Steps represented in FIGS. 12A and 12B may be carried out in the environment of FIG. 4 and are described with reference to elements depicted in FIG. 4.

Figure 12C:
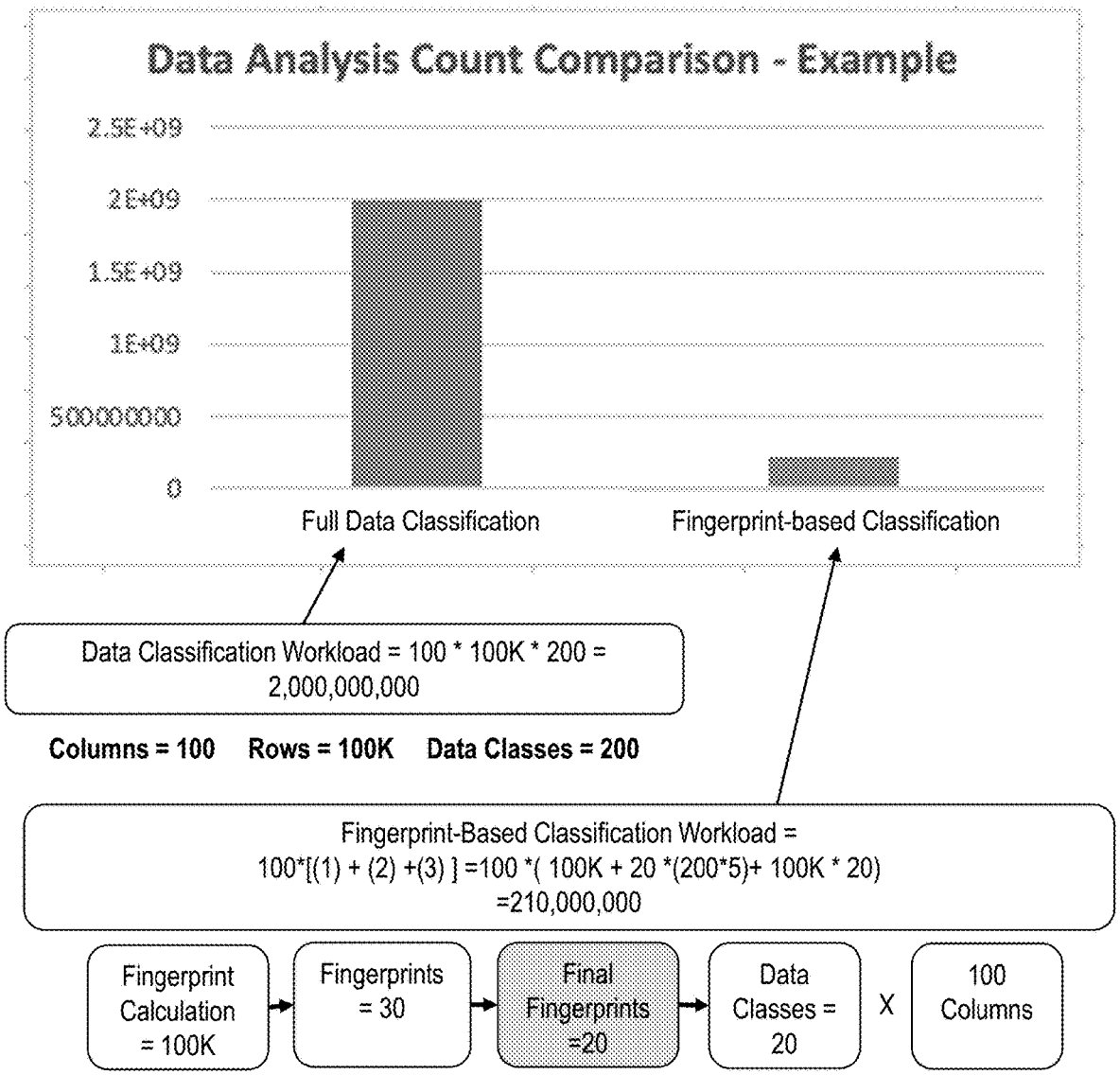
FIG. 12C is a graph illustrating a difference in an amount of work performed during a full data classification of FIG. 12A versus a fingerprint-based classification of FIG. 12B in accordance with embodiments of the invention.

As illustrated in FIG. 12A, during a full data classification method, a server (e.g., server 404) compares data in rows 1202 of all columns 1200 of data to be classified (data input) to each elected data class 1204, in order to output results 1206A in the form of a classified column of data. Accordingly, total workload of a full data classification job can be represented by the following first equation (EQ1):

Total Workload=$M \times N \times R$, wherein $M$ is the number of columns, $N$ is the number of data classes, and $R$ is the number of rows.   EQ1:

In contrast, during a fingerprint data classification method represented in FIG. 12B, a server (e.g., server 404) generates a fingerprint (e.g., 1210) for each column 1200, and compares each fingerprint to target fingerprints (e.g., FP-1 and FP-2) for each class (e.g., data class C and data class D) from the data repository 425. The server 404 can determine a data class (e.g., data class C and data class D) associated with a matching target fingerprint (e.g., FP-1, FP-2), assign the data class to the column 1200 associated with the fingerprint (e.g., 1210), and output results 1206B in the form of a classified column of data. Thus, a total workload of a fingerprint data classification job according to embodiments of the invention can be represented by the following second equation (EQ2):

Total Workload=$M \times$(FP Calculation+FP Matching+$C \times R$), wherein $M$ is the number of columns, FP Calculation is the number of fingerprints created, FP matching is the number of target fingerprints compared to the fingerprint created, $C$ is the number of data classes reviewed, and $R$ is the number of rows reviewed.   EQ2:

FIG. 12C is a graph illustrating a difference in an amount of work performed during a full data classification of FIG. 12A versus a fingerprint-based classification of FIG. 12B in accordance with embodiments of the invention. For the full data classification of FIG. 12A, given an example of 100 columns, 100 K rows and 200 data classes, the workload would be 2,000,000,000. For the fingerprint-classification, given 5 fingerprints for every data class, 200 data classes, and 20 fingerprints selected for one data column, the number of fingerprint matching (FP matching)=20*(200*5) for each column. As demonstrated by the graph of FIG. 12C, fingerprint-based classification provides classification of data with significantly less work (210,000,000 vs 2,000,000,000) than full data classification methods.

Figure 13A:
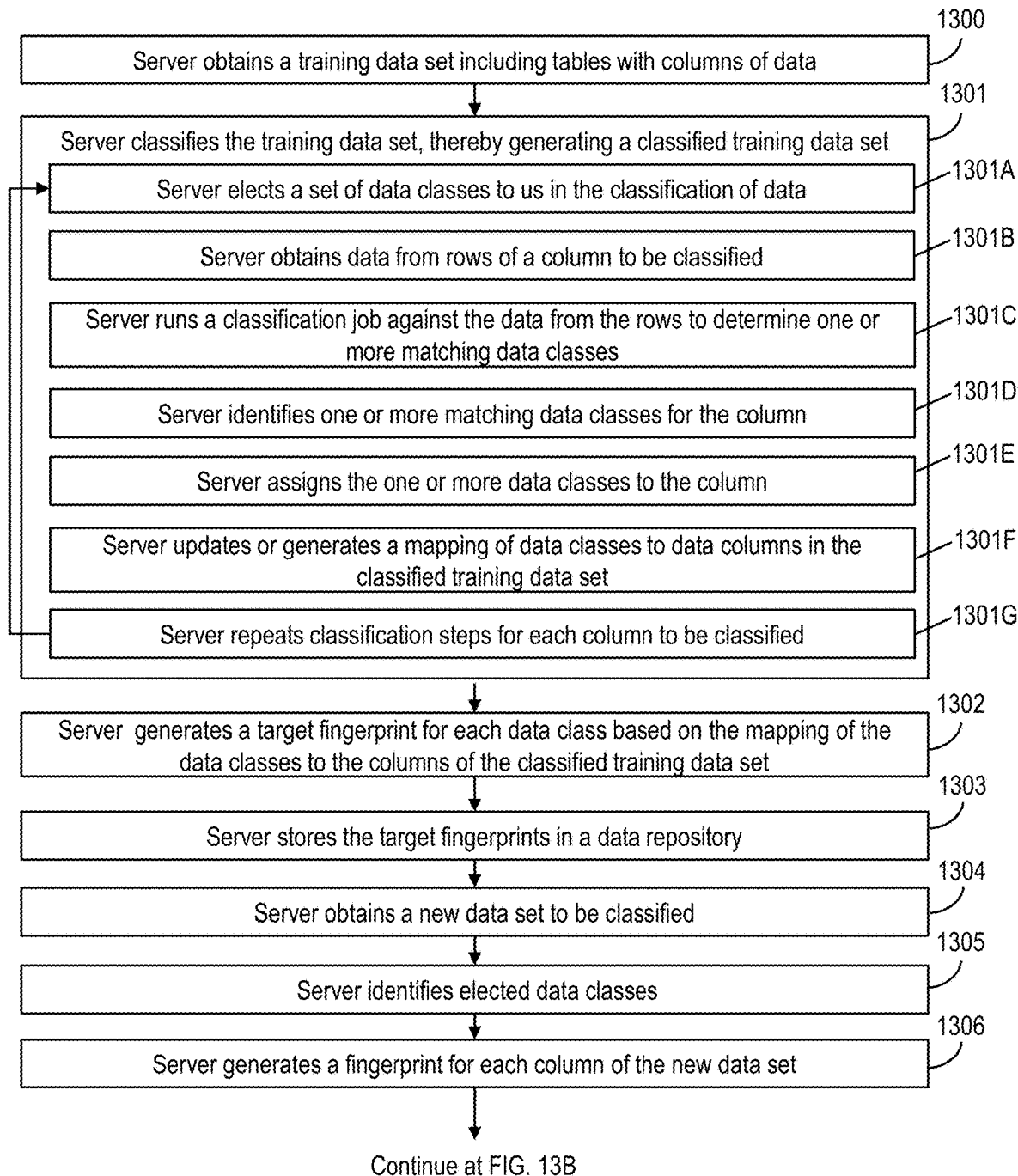
FIGS. 13A and 13B show a flowchart of an exemplary method in accordance with aspects of the present invention.
Figure 13B:
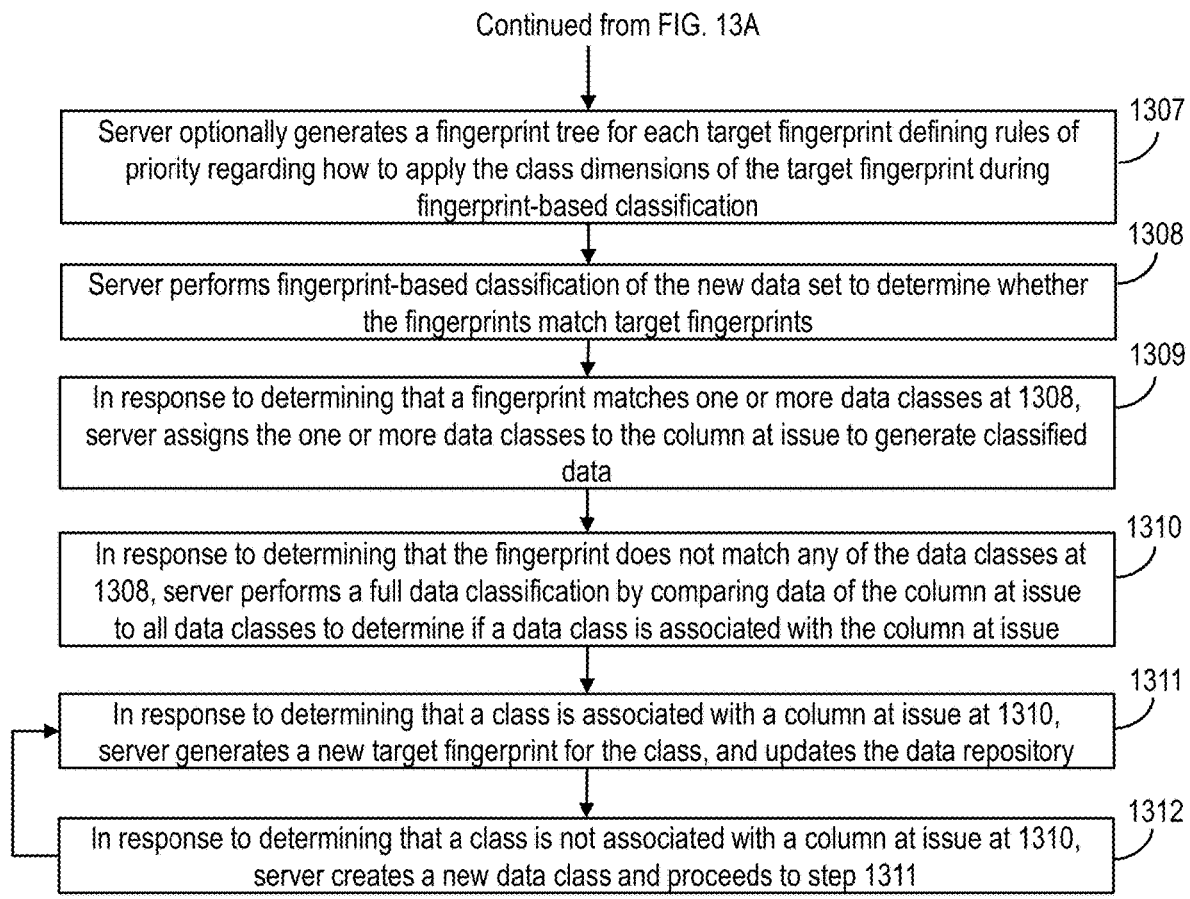

FIGS. 13A and 13B show a flowchart of an exemplary method in accordance with aspects of the present invention. Steps of the method may be carried out in the environment of FIG. 4 and are described with reference to elements depicted in FIG. 4.

With initial reference to FIG. 13A, at step 1300, server 404 obtains a training data set, including tables with columns of data. The server 404 may obtain the training data set from local data storage (e.g., via the data storage module 424) or from remote storage (e.g., via the data storage module 430). In embodiments the training data set has already been classified, in which case the server 404 utilizes an existing mapping of classes to columns of the training data set and does not perform step 1301. In embodiments, the data collection module 420 of the server 404 implements step 1300.

At step 1301, in the case where the training data set has not yet been classified, the server 404 classifies the training data set using a full data classification method, thereby generating a classified training data set. Various classification methods and tools could be utilized to obtain a mapping of classes to columns of data for a training data set. In embodiments, the server 404 determines data classes associated with each data column of the training data set based on matches between predetermined parameter sets for each data class and the data in each of the data columns. In implementations, sub steps of step 1301 include the server 404: electing (selecting) a set of data classes (e.g., a subset of all available data classes) to use in the classification of data from all available data classes (1301A); obtaining data from rows of a column to be classified (1301B); running a classification job against the data from the rows of the column to determine one or more matching data classes (1301C); identifying one or more matching data classes for the column (1301D); assigning the one or more data classes to the column (1301E); updating a mapping of data classes to data columns for the training data set (1301F); and repeating the above for each column to be classified (1301G). In embodiments, the classification module 421 of the server 404 implements step 1301.

In one example, a data set to be classified includes a column A that contains national identity numbers. A predetermined classification exists called "Nat_ID" for national identity numbers, and is defined by a classification format including the following parameter (dimension) set: data class type is regex; data type is string; threshold is 90; minimum data length is 9; maximum data length is 9; and regular expression is ^[0-9]{9}$. In this example, the server 404 runs a full data classification analysis against the data in the column A, and if 90% or more of the data in column A matches the parameter set, the server 404 classifies column A as "Nat_ID" (i.e., national identity numbers). If the server 404 determines that the threshold of 90% or more matching data is not met, the server 404 moves on to the next class to see if it is a match for column A, and so on, until all classes have been compared to the data of column A.

At step 1302, the server 404 generates a target fingerprint for each data class based on the mapping of the data classes to the columns of the training data set, wherein the target fingerprint includes an attribute for each of a plurality of class dimensions (e.g., characteristics) and an assigned weight. A set of class dimensions for a target fingerprint may include, for example, length, min-max, format, unique, FD, and special character (SpecialC)). In implementations, the server 404 determines patterns in class dimensions of classified historic data sets (e.g., utilizing machine learning algorithms) and determines attributes for the class dimensions based on the determined patterns and predetermined rules. Weights may be assigned to class dimensions manually by an administrator or may be determined automatically based on predetermined rules. Various methods of assigning weights may be used, and the invention is not intended to be limited to any of the examples discussed herein. In embodiments, the classification module 421 of the server 404 implements step 1302.

In one example, the server 404 analyses data in a column classified as "Nat_ID" and determines attributes for predetermined class dimensions. Table 2 below illustrates exemplary class dimension attributes of a fingerprint for the class "Nat_ID". In the example of Table 2, attribute "9" indicates a length (number of digits); "0~999999999" indicates a minimum value is 0 and a maximum number is 999999999; "999999999" indicates the format comprises 9 numbers; "True" indicates that the value is unique; "80%" indicates a frequency distribution of 80% is required as a threshold value; and "None" indicates that there are no special characters (SpecialC) in the data.

TABLE 2

Exemplary Fingerprint for class "Nat_ID"

| Dimension | Attribute | Weight |
|---|---|---|
| Length | 9 | 40% |
| Min-Max | 0~999999999 (number from 0 to 999999999) | 25% |
| Format | 999999999 (means all types are Number) | 20% |
| Unique | True | 5% |
| FD | 80% | 10% |
| SpecialC | None | 0% |

At step 1303, the server 404 stores the target fingerprints for each class in the data repository 425. In implementations, a mapping of the target fingerprints and associated classes is saved in the data repository 425. In embodiments, the classification module 421 of the server 404 implements step 1303.

At step 1304, the server 404 obtains a new data set to be classification, including tables with columns of data. The server 404 may obtain the new data set from a local data store or may obtain the new data set from a remote data store. In embodiments, the data collection module 420 of the server 404 implements step 1304.

At step 1305, the server 404 identifies elected data classes. In embodiments, the server 404 provides a user interface to one or more users to access a display enabling users to select (elect) a set of data classes, out of all possible data classes, to use in a classification of the new data set. In implementations, the elected data classes comprise all available data classes (e.g., by default or based on a user selection of all available data classes). In embodiments, the classification module 421 of the server 404 implements step 1305.

At step 1306, the server 404 generates a fingerprint for each column in the new data set, wherein each fingerprint comprises an attribute for each of a plurality of column dimensions (e.g., characteristics) based on the data in the column, and a weight for each column dimension. In implementations, the server 404 determines patterns in column dimensions of column data (e.g., by machine learning algorithms) and determines attributes for the column dimensions based on the determined patterns and predetermined rules. Various methods may be utilized to extract attributes of column dimensions according to step 1306, and the invention is not intended to be limited to any examples herein. In embodiments, the server 404 determines a frequency with which the determined attribute of a column dimension occurs in the column at issue and assigns a dimension weight based on the frequency (i.e., based on frequency distribution). In embodiments, the fingerprinting module 422 of the server 404 implements step 1306.

In one example, column dimensions in the fingerprint include length, min-max, format, unique, frequency distribution (FD), and special character (SpecialC). In one example, the server 404 determines an actual length of data in a column (e.g., 9 digits long); a minimum and maximum value for the column (i.e., min/max); whether the format is composed of characters (C), numbers (9), unique codes (U) and special codes (Z); and whether the column includes and special characters (SpecialC). In this example, the unique code (U) is True if every value in the column is unique and is False if some values are duplicated. The FD in this example is a percent rate of length and format in the column.

Turning to FIG. 13B, at step 1307, the server 404 optionally generates a fingerprint tree for each target fingerprint, the fingerprint tree defining rules of priority regarding how to apply the class dimensions of the target fingerprint during fingerprint-based classification of the column of data. In implementations, the server 404 determines an order of priority based on the dimension weights of the target fingerprint. Thus, in implementations, the most common class dimensions (as indicated by dimension weight) are designated as leading keys to build the fingerprint tree for class of data. In embodiments, the fingerprinting module 422 of the server 404 implements step 1307.

At step 1308, the server 404 performs fingerprint-based classification of the new data set to determine whether the fingerprint of each column of the new data set matches one or more data classes by comparing the fingerprint of the column at issue with target fingerprints in the data repository. In implementations, the server 404 determines matches based on only a portion of the fingerprint (e.g., based on only some of the fingerprint column dimensions according to the fingerprint tree). In aspects of the invention, when the server 404 determines that a fingerprint of a column is a match for a target fingerprint, the server 404 determines the class associated with the target fingerprint is a match to the fingerprint of the column at issue. In embodiments, the server 404 determines matches based on predetermined threshold values and the dimension weights in the fingerprint at issue. In implementations of the invention, the server 404 determines a match when a percent (%) of weighted dimension attributes of the fingerprint that match the weighted parameters of a target fingerprint are greater or equal to a threshold value. In embodiments, the threshold value is a threshold value defined by the target fingerprint. An example of matching a fingerprint of a column to a target fingerprint is discussed above with respect to FIG. 8. In embodiments, the classification module 421 of the server 404 implements step 1308.

At step 1309, in response to determining that the fingerprint of a column at issue matches one or more data classes at step 1308, the server 404 assigns the one or more data classes to the column (e.g., for the purpose of data analysis), thereby generating classified data. In implementations, assigning the data classes results in a mapping of the column at issue to the one or more data classes, wherein the mapping can be utilized by data analysis tools and methods during analysis of the new data set. Various data analysis tools and methods may be utilized after classification by methods of the present invention, and the invention is not intended to be limited by any downstream data analysis method. In embodiments, the classification module 421 of the server 404 implements step 1309.

At step 1310, in response to determining that the fingerprint of a column at issue does not match any of the data classes at step 1308, the server 404 performs a full data classification to compare data of the column at issue to all data classes to determine whether a data class is associated with the column at issue. In embodiments, the classification module 421 of the server 404 implements step 1310.

At step 1311, in response to determining that a class is associated with the column at issue at step 1310, the server 404 generates a new target fingerprint for the class based on the fingerprint of the column at issue and updates the data repository 425 with the new target fingerprint. In embodiments, the fingerprinting module 422 of the server 404 implements step 1311.

At step 1312, in response to determining that a class is not associated with the column at issue at step 1310, the server 404 creates a new data class based on the column at issue and proceeds to step 1311 to generate a new target fingerprint and update the data repository 425. In embodiments, the classification module 421 of the server 404 implements step 1312.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating, by a computing device based on predetermined rules, a first fingerprint of a first data column in a data set to be classified, the fingerprint comprising column dimensions, wherein each of the column dimensions is assigned an attribute representing a characteristic of data in the data column;
determining, by the computing device, that the first fingerprint matches one or more target fingerprints by comparing the first fingerprint to the target fingerprints, wherein each target fingerprint is associated with a class and includes class dimensions, each class dimension is assigned an attribute representing a characteristic of data in the class, and each of the one or more target fingerprints further include a weight assigned to each of the class dimensions based on a frequency distribution of each of the class dimensions; and
assigning, by the computing device, one or more classes to the data column based on the one or more target fingerprints, thereby generating classified data.

2. The method of claim 1, wherein the column dimensions of the first fingerprint and the class dimensions of the target fingerprints are each selected from one or more of the group consisting of: length of data; format of data; minimum and maximum values of the data; special characters in the data; whether the data is unique; and a frequency distribution.

3. The method of claim 1, further comprising generating a fingerprint tree for each of the target fingerprints, each fingerprint tree defining rules of priority for the class dimensions of a respective target fingerprint, wherein the determining that the first fingerprint matches the one or more target fingerprints comprises comparing the column dimensions of the first fingerprint to the class dimensions of the one or more target fingerprints based on the rules of priority defined by the fingerprint tree.

4. The method of claim 3, wherein generating a fingerprint tree for each of the target fingerprints further comprises determining an order of priority based on the weight assigned to each of the class dimensions of the target fingerprint.

5. The method of claim 1, further comprising:
accessing, by the computing device, classified training data including columns of data each associated with a class; and
generating, by the computing device, the target fingerprints based on the training data.

6. The method of claim 5, further comprising:
obtaining, by the computing device, training data to be classified;
classifying, by the computing device, the training data, thereby generating the classified training data.

7. The method of claim 1, further comprising:
generating, by the computing device based on the predetermined rules, a second fingerprint of a second data column in the data set to be classified, the second fingerprint comprising column dimensions, wherein each column dimension of the second fingerprint is assigned an attribute representing a characteristic of data in the second data column;
determining, by the computing device, that the second fingerprint does not match the one or more target fingerprints by comparing the second fingerprint to the one or more target fingerprints; and
in response to determining that the second fingerprint does not match the one or more target fingerprints, performing, by the computing device, a full data classification of the second data column by comparing data of the second data column to multiple data classes to determine whether at least one of the multiple data classes is associated with the second data column.

8. The method of claim 7, further comprising:
in response to determining that at least one of the multiple data classes is not associated with the second data column:
creating, by the computing device, a new class for the second data column; and
generating and storing, by the computing device, a new target fingerprint for the new class.

9. The method of claim 7, further comprising:
in response to determining that at least one of the multiple data classes is associated with the second data column, generating, by the computing device, a new target fingerprint for the at least one of the multiple data classes.

10. The method of claim 1, wherein the computing device includes software provided as a service in a cloud environment.

11. A computer program product comprising one or more computer readable storage media having program instructions collectively stored on the one or more computer readable storage media, the program instructions executable to cause a computing device to:
generate, based on predetermined rules, a fingerprint of a data column in a data set to be classified, the fingerprint comprising column dimensions, wherein each of the column dimensions is assigned an attribute representing a characteristic of data in the data column;
determine whether the fingerprint matches one or more target fingerprints by comparing the fingerprint to the target fingerprints, wherein each target fingerprint is associated with a class and includes class dimensions, each class dimension is assigned an attribute representing a characteristic of data in the class, and each of the one or more target fingerprints further include a weight assigned to each of the class dimensions based on a frequency distribution of each of the class dimensions;
in response to determining that the fingerprint matches the one or more target fingerprints, assign one or more classes to the data column based on the one or more target fingerprints, thereby generating classified data; and
in response to determining that the fingerprint does not match the one or more target fingerprints, perform a full data classification of the data column by comparing data of the data column to multiple data classes to determine whether at least one of the multiple data classes is associated with the data column.

12. The computer program product of claim 11, wherein the program instructions are further executable to cause the computing device to, in response to determining that at least one of the multiple data classes is not associated with the data column:
create a new class for the data column; and
generate and store a new target fingerprint for the new class.

13. The computer program product of claim 11, wherein the program instructions are further executable to cause the computing device to, in response to determining that at least one of the multiple data classes is associated with the data column, generate a new target fingerprint for the at least one of the multiple data classes.

14. The computer program product of claim 11, wherein the column dimensions of the fingerprint and the class dimensions of the target fingerprint are each selected from one or more of the group consisting of: length of data; format of data; minimum and maximum values of the data; special characters in the data; whether the data is unique; and a frequency distribution.

15. The computer program product of claim 11, wherein the program instructions are further executable to cause the computing device to generate a fingerprint tree for each of the target fingerprints, each fingerprint tree defining rules of priority for the class dimensions of a respective target fingerprint, wherein the determining that the fingerprint matches the one or more target fingerprints comprises comparing the column dimensions of the fingerprint to the class dimensions of the one or more target fingerprints based on the rules of priority defined by the fingerprint tree.

16. The computer program product of claim 15, wherein the program instructions that are executable to cause the computing device to generate a fingerprint tree for each of the target fingerprints further cause the computing device to determine an order of priority based on the weight assigned to each of the class dimensions of the target fingerprint.

17. The computer program product of claim 11, wherein the program instructions are further executable to cause the computing device to:
access classified training data including columns of data each associated with a class; and
generate the target fingerprints based on the training data.

18. A system comprising:
a processor, a computer readable memory, one or more computer readable storage media, and program instructions collectively stored on the one or more computer readable storage media, the program instructions executable to cause a computing device to:
generate, based on predetermined rules, a fingerprint of a data column in a data set to be classified, the fingerprint comprising column dimensions, wherein each of the column dimensions is assigned an attribute representing a characteristic of data in the data column;
determine whether the fingerprint matches one or more target fingerprints by comparing the fingerprint to the target fingerprints, wherein each of the target fingerprints is associated with a class and includes class dimensions, each class dimension is assigned an attribute representing a characteristic of data in the class, and each of the one or more target fingerprints further include a weight assigned to each of the class dimensions based on a frequency distribution of each of the class dimensions;
in response to determining that the fingerprint matches the one or more target fingerprints, assign one or more classes to the data column based on the one or more target fingerprints, thereby generating classified data; and
in response to determining that the fingerprint does not match the one or more target fingerprints, perform a full data classification of the data column by comparing data of the data column to multiple data classes to determine whether at least one of the multiple data classes is associated with the data column.

19. The system of claim 18, wherein the program instructions are further executable to cause the computing device to:
in response to determining that at least one of the multiple data classes is not associated with the data column:
create a new class for the data column; and
generate and store a new target fingerprint for the new class; and in response to determining that at least one of the multiple data classes is associated with the data column, generate a new target fingerprint for the at least one of the multiple data classes.

20. The system of claim 18, wherein the program instructions are further executable to cause the computing device to generate a fingerprint tree for each of the target fingerprints, each fingerprint tree defining rules of priority for the class dimensions of a respective target fingerprint, wherein the determining that the fingerprint matches the one or more target fingerprints comprises comparing the column dimensions of the fingerprint to the class dimensions of the one or more target fingerprints based on the rules of priority defined by the fingerprint tree.

* * * * *